Feb. 13, 1934.  I. F. LINDBERG ET AL  1,946,911
METHOD OF AND APPARATUS FOR ASSEMBLING CHAIN STRUCTURES
Filed May 11, 1931   2 Sheets-Sheet 1

Inventors
I. F. Lindberg
W. E. Yunker
by G. A. Elvin
Attorney

Feb. 13, 1934.      I. F. LINDBERG ET AL      1,946,911
METHOD OF AND APPARATUS FOR ASSEMBLING CHAIN STRUCTURES
Filed May 11, 1931      2 Sheets-Sheet 2
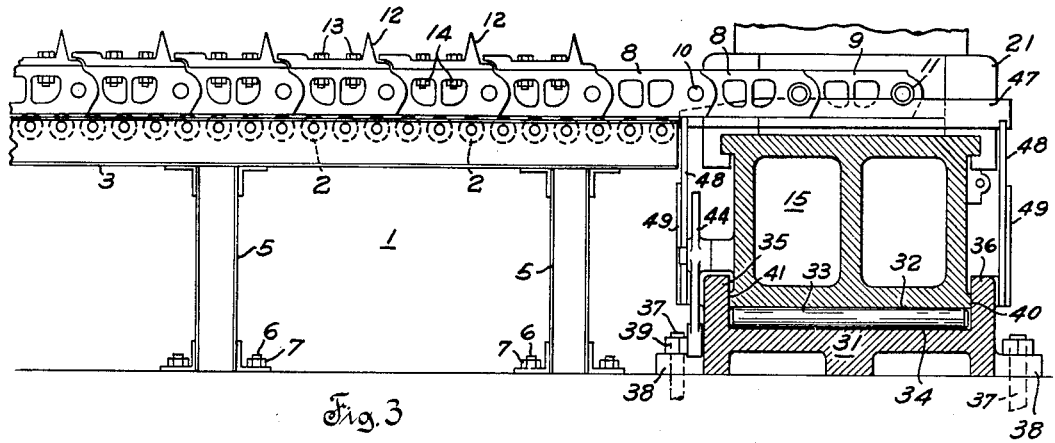
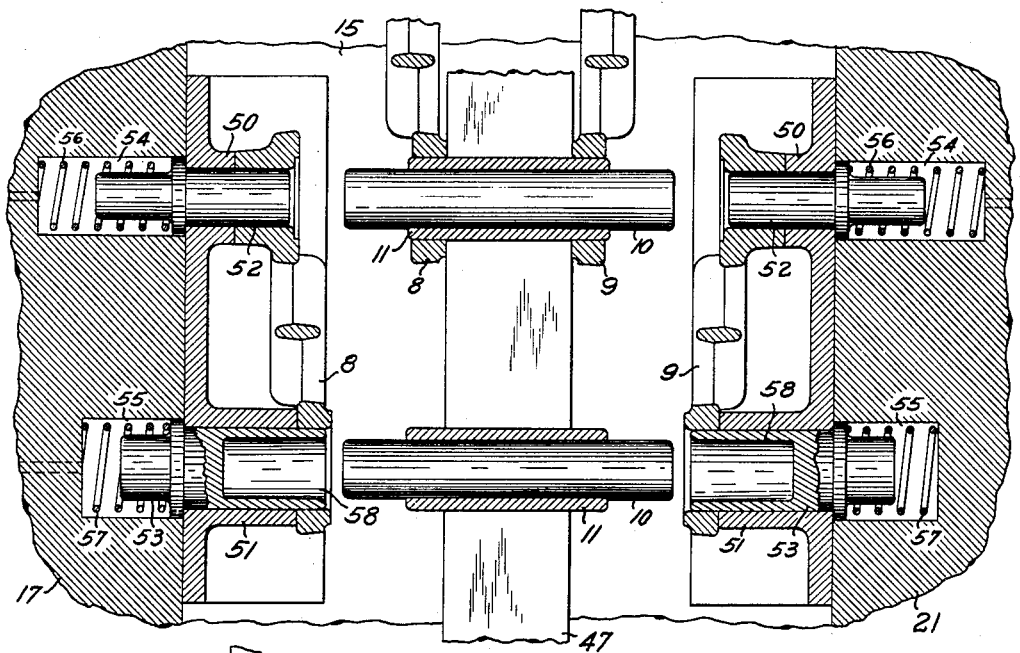
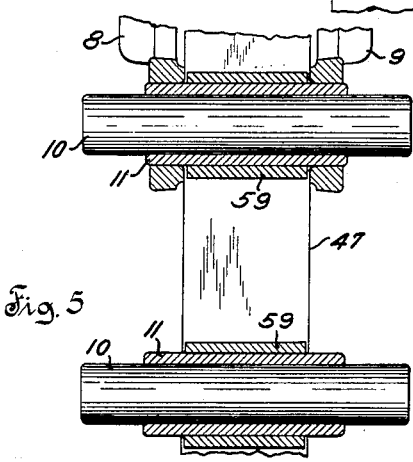

Patented Feb. 13, 1934

1,946,911

UNITED STATES PATENT OFFICE 1,946,911

METHOD OF AND APPARATUS FOR ASSEMBLING CHAIN STRUCTURES

Ivar F. Lindberg, West Allis, Wis., and William E. Yunker, Springfield, Ill., assignors to Allis-Chalmers Manufacturing Company, Milwaukee, Wis., a corporation of Delaware Application May 11, 1931. Serial No. 536,328

17 Claims. (Cl. 59—7)

This invention relates generally to the production of chains, and it pertains more specifically to the art of making track chains for vehicles of the self-laying track type.

It is an object of the invention to provide an improved method of assembling track chains for vehicles of the self-laying track type, wherein the individual link sections are made up of a number of parts.

Another object of the invention is to provide an improved method of assembling link sections for track chains, which involves securing hinge elements to a pair of oppositely disposed rail members in a manner such as to obtain a greater degree of accuracy and uniformity of the assembled link section.

Another object of the invention is to provide an apparatus of improved construction, which may be used advantageously to assemble track chains for vehicles of the self-laying track type.

These and other objects and advantages of the invention will be apparent from the following description. A clear conception of a preferred manner in which the invention may be carried out will be had by referring to the drawings accompanying and forming a part of this specification, in which like reference characters designate the same or similar parts in the several views.

Fig. 3 is a side view of the equipment shown in Fig. 1, the right hand end of this figure being a section on line III—III of Fig. 1.

Fig. 4 is a detail section taken on the horizontal plane indicated by line IV—IV of Fig. 2, the parts being seen on an enlarged scale.

Fig. 5 is a view similar to Fig. 4, illustrating a particular step which may be taken in carrying out the invention.

Figure 1:
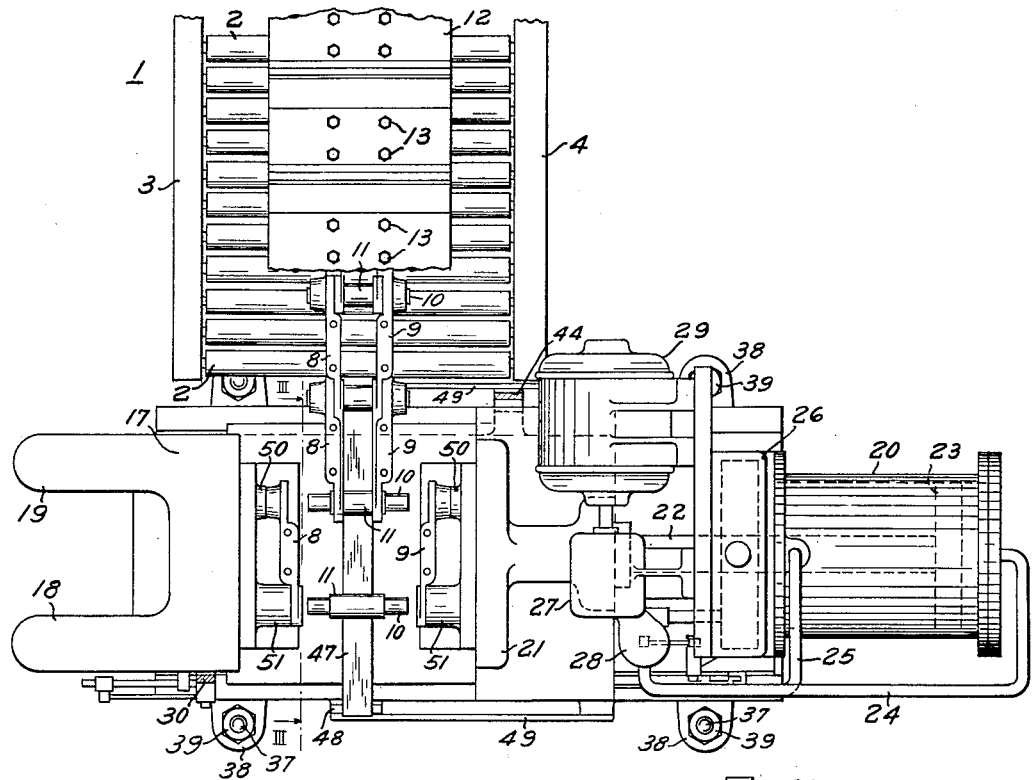
Fig. 1 is a top elevation of an equipment for assembling track chains for track-laying vehicles.

The numeral 1 (Figs. 1 and 3) indicates, generally, a longitudinally extending support for a track chain comprising a series of interconnected chain links and a series of track shoes. The track chain rests on a series of rollers 2 which are rotatably mounted on two side beams 3 and 4. The side beams are held in elevated position by legs 5 which in turn are bolted to a foundation by means of foundation bolts 6 and nuts 7. Each chain link consists of two side members or rail members 8 and 9, a hinge pin 10 fastened to the rail members at one end of the link and a bushing 11 fastened to the rail members at the other end of the link. A track shoe 12 is secured to each pair of side members 8 and 9 by means of bolts 13 and nuts 14, and adjoining links are pivotally connected to each other in the usual manner by rotatably mounting the bushing at the end of one link on the hinge pin at the adjacent end of the next link.

A hydraulic press of particular construction for joining another link to the track chain resting on the support 1, is provided adjacent to the forward end of this support. The main body of the press consists of a frame structure 15 designed as a hollow casting with an upwardly projecting portion 16 at one end and an upwardly projecting abutment 17 at the other end. The abutment is reinforced by heavy ribs 18 and 19, and the upwardly projecting portion 16 at the opposite end of the frame structure has a vertically disposed machined end surface on which the operating cylinder 20 of the hydraulic press is mounted in horizontal disposition. Slidably mounted on the upper medial portion of the frame 15 is a ram 21 which is connected to a piston rod 22 extending through the upwardly projecting portion 16 of the frame and into the cylinder 20. A piston 23 within the cylinder 20 is connected to the piston rod 22 and moved in one direction or the other by fluid pressed into the cylinder through pipe lines 24 and 25, respectively. A fluid reservoir 26, a pump mechanism 27, a valve mechanism 28, and an electric motor 29 for driving the pump mechanism are mounted on the portion 16 of the frame 15 and serve to supply operating fluid for the cylinder 20. An operating lever 30 pivotally mounted on the frame 15 is connected to the valve mechanism 28 by means of a suitable lever system in such a manner that by moving the lever 30 out of a neutral position in one direction pressure fluid is admitted to the cylinder 20 through the pipe line 24 while at the same time the pipe line 25 is brought in communication with the reservoir 26, and that by moving the operating lever 30 out of a neutral position in the other direction pressure fluid is admitted to the cylinder 20 through the pipe line 25 while at the same time the pipe line 24 is brought in communication with the reservoir 26.

The frame 15 of the hydraulic press is mounted on a base 31 in such a manner that it can be moved reciprocably in front of and transversely to the longitudinally extending support 1. In order to accomplish this result the bottom portion of the frame 15 is provided with a smooth horizontal surface 32 which cooperates with a plurality of rollers 33 bearing upon an equally smooth horizontal surface 34 of the base 31. As best shown in Fig. 3 the base has a substantially channel shaped cross section with upwardly extending flanges 35 and 36, and it is securely mounted on a foundation by means of foundation bolts 37 extending through mounting lugs 38 and by nuts 39 threaded upon the mounting bolts. The vertical flanges 35 and 36 of the base have their inner vertical surfaces machined to form guide surfaces for the frame 15 of the press which is provided with vertical guide surfaces 40 and 41 extending along the sides of the frame at the bottom portion thereof and cooperating with the inner vertical surfaces of the flanges 35 and 36. It will be seen that the frame 15 of the press can easily be moved on the base 31 in a direction transversely to the longitudinally extending support 1, or in other words, in the direction in which the ram 21 moves relative to the abutment 17. In order to prevent the press from leaving the base 31 the bottom portion of the frame 15 is provided with downwardly projecting lugs 42 and 43 at the ends of the machine surface 32. If the press is moved in one direction or the other, one or the other of the lugs 42 and 43 will come into engagement with the roller 33 lying next to it and prevent the press from being pulled or pushed from the base. In order to move the press on the base and adjust it relative to the support 1, or more accurately stated, relative to the track chain resting on the support 1, an adjusting lever 44 is provided which is pivotally mounted on the frame 15 and has a lower fork shaped end 45 cooperating with a stationary pin 46 projecting laterally from the base 31.

The end of the track chain resting on the longitudinally extending support 1 projects forwardly from said support and is held in a stationary position in the space between the abutment 17 and the ram 21 of the press by a supporting structure which is stationarily mounted on the base 31. The supporting structure comprises a beam 47 and lateral braces 48 and 49 which are mounted on the outer surface of the vertical flanges 35 and 36 of the base, respectively. The end of the beam 47, adjacent to the supporting structure 1 is tapered off as shown in Fig. 3, and the upper surface of the beam has a notch adapted to receive the bushing 11 at the end of the track chain lying on the support 1, and another notch adapted to receive the bushing of the link which is to be joined to the track chain. The spacing of the notches in the beam 47 is such that when the bushings are placed therein, the distance from the center of one bushing to the center of the next bushing is exactly the same as in the assembled track link.

Figure 2:
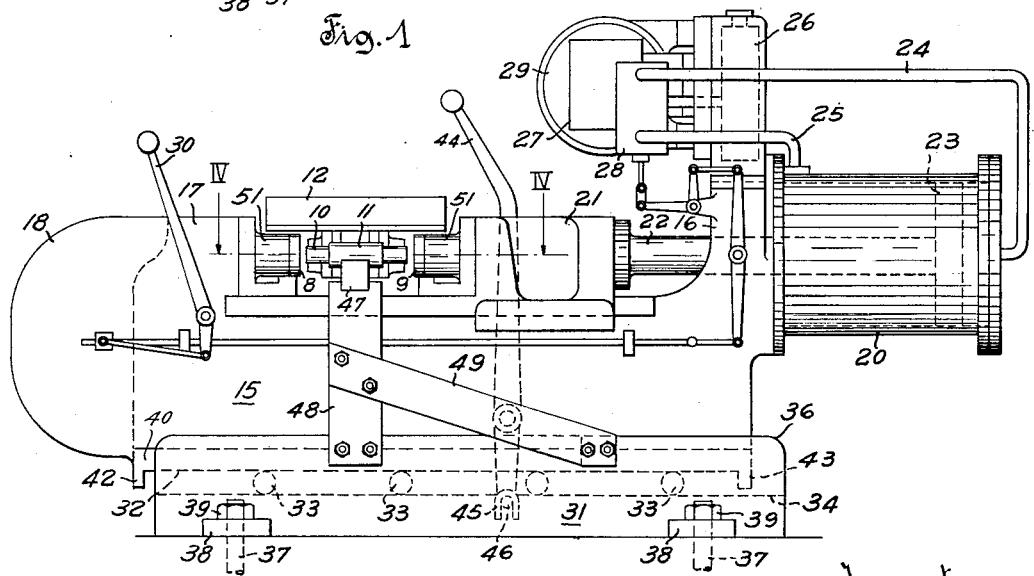
Fig. 2 is a front elevation of the equipment shown in Fig. 1.

A fixture for holding a side member 8 in an upright position at one side of the beam 47 is mounted on the abutment 17 of the press frame, and a similar fixture for holding a side member 9 at the other side of the beam in a position exactly opposite and parallel to the side member 8 is mounted on the ram 21 of the press. The fixtures are substantially alike with the exception that one is made opposite hand to the other and only one, therefore, will be described in detail. As shown in Figs. 1 and 2, the fixture mounted on the abutment 17 comprises a lower, horizontally disposed portion with an upturned edge for supporting the side member from below, and a vertically disposed portion with a machined rear surface which engages a correspondingly machined vertical surface of the abutment 17. The side member is seated laterally on two cylindrical lugs 50 and 51 (Fig. 4), and is held more securely on the fixture by plungers 52 and 53 projecting axially from the cylindrical lugs 50 and 51, respectively. The plungers extend rearwardly into suitable holes 54 and 55, respectively, provided in the abutment 17 and are yieldingly held in the position shown in Fig. 4 by coil springs 56 and 57 extending between a shoulder on each plunger and the bottom of the respective hoe. The plunger 53 has a counter bore 58 adapted to receive the end of a hinge pin 10 during the pressing operation which will now be described.

The end of the track chain to which a new link is to be added is placed upon the supporting beam 47 with the bushing 11 at the end of the last link resting in the notch closest to the support 1, as shown in Fig. 1. The bushing embraces a hinge pin 10, holding it in a horizontal position and in alinement with the plungers 52 of the fixtures at both sides of the supporting beam 47. Another bushing 11 embracing a second hinge pin 10 is placed into the second notch of the beam, and is held therein in a horizontal position and in alinement with the counter-bored plungers 53 of the fixtures at both sides of the supporting beam 47. A side member 8 is placed upon the fixture associated with the abutment 17 in a position as shown in Fig. 4 and a corresponding opposite side member 9 is placed upon the fixture associated with the ram 21. In order to provide sufficient space for putting the side members 8 and 9 upon the fixtures, and the bushings 11 and pins 10 upon the supporting beam 47, the ram is brought into a withdrawn position such as shown in Fig. 2, and the frame 15 of the press is adjusted by means of the adjusting lever 44 to such a position relative to the stationary supporting beam that both fixtures are about equidistant from said beam. After the mentioned parts for the new link have been put in place as shown in Fig. 4 pressure fluid is admitted to the cylinder 20 through the pipe line 24 by manipulating the hand lever 30. While the ram advances in the direction towards the abutment 17 the adjusting lever 44 is manipulated by the operator of the press in such a manner that both fixtures are kept practically equidistant from the supporting beam 47. In order to accomplish this result the operator has to move the knob of the lever 44 in a direction away from the abutment 17, and by properly regulating the movement of the frame 15 in proportion to the advancement of the ram 21 the plungers 52 opposite to the ends of the pin 10 will be brought practically simultaneously in contact with the pin. In other words, the operator will manipulate the lever 44 in such a manner as to compensate lateral displacement of the virtual center between the relatively approaching side members 8 and 9 with respect to the support 47, it being obvious that the virtual center between the relatively approaching side members moves with respect to the abutment 17 in the direction in which the ram 21 advances, and that without manipulation of the lever 44 during advancement of the ram 21, the virtual center between the relatively approaching side members would be displaced laterally with respect to the support 47. After the plungers 52 have been moved into contact with the pin 10 further advancement of the ram 21 towards the abutment 17 causes the side members 8 and 9 to be pressed upon the pin 10, the pressure originating in the cylinder 20 and being transmitted from the side member 9 upon the side member 8 through the pin 10. While the side members 8 and 9 proceed on the pin 10 the plungers 53 will engage the end faces of the bushing 11 and the side members will also proceed upon the bushing 11. Coincidentally with the advancement of the side members 8 and 9 upon the pin 10 and bushing 11 the springs 56 and 55 will be compressed. While the side members 8 and 9 are being driven upon the pin 10 and bushing 11 the virtual center between the relatively approaching side members will be subject to displacement laterally with respect to the support 47. Any such lateral displacement, however, as has been explained, may be compensated by adjusting the frame 15 of the press relative to the support 47, and the operator will manipulate the lever 44 accordingly to effect such compensation. Advancement of the ram 21 towards the abutment 17 will continue until the ram has approached the abutment 17 so far that a positive stop is offered by the plungers 52 with the interposed pin 10 at one hand, and by the plungers 53 with the interposed bushing 11 at the other hand. When this condition has been reached the rear ends of the plungers 52 and 53 are seated on the bottoms of their respective holes 54 and 55, and the ends of the pin 10 which is disposed between the plungers 52 have been forced into the correspondingly dimensioned holes at one end of the side members 8 and 9, while the ends of the bushing 11 which is disposed between the plungers 53 have been forced into the correspondingly dimensioned holes at the other end of the side members. The ends of the pin 10 disposed between the plungers 53 have freely entered the counter-bores 58 of these plungers, the diameter of the counter-bores being somewhat larger than the pin diameter. It will be seen that the new chain link which is to be added to the track chain lying on the support is completely assembled by the described pressing operation. The fixtures may be removed from the side members by withdrawing the ram, and by manipulating the adjusting lever 44 in such a manner that the space between the abutment 17 and the supporting beam 47 is increased. The track chain may then be moved backward on the rollers 2 so as to bring the bushing 11 of the newly assembled chain link into the notch of the beam 47, which is closest to the support 1, whereupon another link may be joined to the track chain in the described manner. The track shoes 12 are preferably bolted to the assembled chain links which have been brought upon the longitudinally extending support 1.

It will be seen that in carrying out the assembling process in the described manner the side members of the links are pressed in opposite directions upon the ends of a hinge pin and a bushing, and that due to the floating arrangement of the hydraulic press a new link may be added to a series of assembled chain links without the necessity of imparting any movement to said series of assembled chain links. The pins and bushings may, therefore, be pressed very accurately into their respective holes in the side members.

The bushings 11 of the track chain shown in Fig. 1 are firmly held, as will be understood, in the side members 8 and 9 of the chain links, and under certain conditions a more satisfactory operation of the track chain is obtained if each of the bushings is surrounded by a roller 59 as shown in Fig. 5. A track chain having rollers 59 mounted on the bushings 11 may be assembled in substantially the same manner as has been described hereinbefore, it being only necessary to slide the bushing 59 over the respective bushing 11 before it is placed upon the supporting beam 47. The notches in the beam received in this case the rollers 59 instead of the bushings 11 and they are preferably shaped with a radius of curvature corresponding to the curvature of the outer roller surface, and they are disposed relative to the press in such a manner that the roller when placed into one of the notches has its axis alined with the axes of the respective plungers in the fixtures at both sides of the beam 47.

It should be understood that it is not intended to limit the invention to the exact details of the equipment and procedure which have been disclosed hereinbefore, for various modifications within the scope of the claims may occur to persons skilled in the art.

It is claimed and desired to secure by Letters Patent:

1. In combination, a structure providing a longitudinally extending support for a series of interconnected chain links, a device for joining another link to said series of chain links by pressing two opposite side members upon the ends of a hinge pin embraced by a bushing at the end of said series of chain links, and means permitting said structure and said device to reciprocate relative to each other in the direction in which said side members are moved relative to each other by said device in order to press them upon the ends of said hinge pin.

2. In combination, a stationary structure providing a longitudinally extending support for a series of interconnected chain links, a hydraulic press for joining another link to said series of interconnected chain links by forcing two opposite side members upon the ends of a hinge pin embraced by a bushing at the end of said series of chain links, a fixture associated with the frame of said press for holding one of said side members, another fixture associated with a reciprocable ram of said press for holding said other side member, and a stationary base on which the frame of said press is movably mounted so as to permit said frame to be adjusted transversely to said longitudinally extending support.

3. In combination, a stationary structure providing a longitudinally extending support for a series of interconnected chain links, a device for joining another link to said series of chain links by pressing two opposite side members upon the ends of a hinge pin embraced by a bushing at the end of said series of chain links, said device comprising a stationary base, a traversing support movably mounted on said base, a fixture associated with said traversing support for holding one of said side members in a fixed position relative to said traversing support, a ram slidably mounted on said traversing support, another fixture associated with said ram for holding said other side member in a position parallel to said first side member, means for forcing said ram towards said first fixture, and means adapted to hold said hinge pin and said bushing in a stationary position relative to said structure in the space between said two fixtures.

4. In a device for assembling track chains for tractors, a press adapted to force opposite rail members of a track link upon the ends of a first bushing and upon the ends of a hinge pin embraced by a second bushing, a structure for holding said first bushing and said second bushing embracing said hinge pin stationarily in the space between an abutment and a ram of said press, a fixture associated with said abutment for holding one of said rail members, another fixture associated with said ram for holding said other rail member, and a base on which said press is movably mounted so as to permit said abutment to be adjusted relative to said structure in the direction in which said ram is movable relative to said abutment.

5. A method of assembling chain structures, which includes: pressing opposite side members of a chain link upon a plurality of transverse hinge elements carried by a support, by transmitting side pressure from one of said side members upon the other through said transverse hinge elements, and compensating lateral displacement of the virtual center between said side members with respect to said support, due to lateral displacement of said side members relative to each other.

6. A method of assembling chain structures, which includes: pressing opposite side members of a chain link upon a hinge pin and a bushing carried by a support, by applying side pressure to said side members simultaneously to cause mutual approach thereof, and by adjusting said mutually approaching side members with respect to said support so as to keep the virtual center between said mutually approaching side members in a substantially fixed relation to said support.

7. A method of assembling chain structures, which includes: pressing opposite side members of a chain link upon opposite pin portions associated with a preceding chain link, by applying side pressure to said side members simultaneously in opposite directions, and by adjusting said relatively moving side members with respect to said preceding chain link so as to keep the virtual center between said relatively moving side members in a substantially fixed relation to said preceding chain link.

8. A method of assembling chain structures, which includes: pressing opposite side members of a chain link upon opposite ends of a pin element projecting laterally from a preceding chain link, by applying side pressure to said side members simultaneously so as to cause mutual approach thereof, and by adjusting said mutually approaching side members with respect to said preceding chain link so as to keep the virtual center between said mutually approaching side members in a substantially fixed relation to said preceding chain link.

9. A method of assembling chain structures which includes: pressing opposite side members of a chain link upon opposite ends of a pin element floatingly supported for movement in its axial direction by a preceding chain link, by transmitting side pressure from one of said side members upon the other through said pin element, and adjusting said relatively moving side members with respect to said preceding chain link so as to keep the virtual center between said relatively moving side members in a substantially fixed relation to the said preceding chain link.

10. A method of assembling chain structures, which includes: pressing opposite side members of a chain link upon opposite ends of a pin element projecting from side members of a preceding chain link and floatingly supported thereby for movement in its axial direction, by causing sidewise approach of said side members with respect to each other and transmitting side pressure from one of said side members upon the other through said pin element, and adjusting said mutually approaching side members with respect to said preceding chain link so as to keep said side members, while proceeding upon said pin element, approximately equidistant from the side members of said preceding chain link.

11. A method of assembling chain structures which includes: pressing opposite side members of a chain link upon a transverse hinge element carried by a support, by transmitting side pressure from one of said side members upon the other through said transverse hinge element, and compensating lateral displacement of the virtual center between said side members with respect to said support, due to lateral displacement of said side members relative to each other.

12. A device for assembling chain structures, comprising a support for transverse chain elements, a press adapted to force longitudinal chain elements in opposite directions upon said transverse chain elements resting on said support, and means for adjusting said support and said press relative to each other in the direction of relative movement between said transverse and longitudinal chain elements during the pressing operation.

13. A device for assembling chain structures, comprising a stationary support for transverse chain elements, a press adapted to force longitudinal chain elements in opposite directions upon said transverse chain elements resting on said support, and means for adjusting said press relative to said support in the direction of relative movement between said transverse and longitudinal chain elements during the pressing operation.

14. A device for assembling chain structures, comprising a support for transverse chain elements, a press having a frame portion at one side of said support and a plunger element at the other side of said support, means associated with said frame portion and with said plunger element for receiving longitudinal chain elements in such a position that by forcing said plunger element towards said frame portion said longitudinal chain elements are pressed upon opposite ends of said transverse chain elements, and means for reciprocating said support and said press relative to each other in the direction of movement of said plunger element during the pressing operation.

15. A device for assembling chain structures, comprising a stationary support for transverse chain elements, a press having a frame portion at one side of said support and a plunger element at the other side of said support, means associated with said frame portion and with said plunger element for receiving longitudinal chain elements in such a position that by forcing said plunger element towards said frame portion said longitudinal chain elements are pressed upon opposite ends of said transverse chain elements, and means for reciprocating said press during the pressing operation in the direction of the movement of said plunger element.

16. A device for assembling chain structures, comprising a stationary support for transverse chain elements, a press having a frame portion at one side of said support and a plunger element at the other side of said support, means associated with said frame portion and with said plunger element for receiving longitudinal chain elements in such a position that by forcing said plunger element towards said frame portion said longitudinal chain elements are pressed upon opposite ends of said transverse chain elements, a stationary base for said press, and means for manually reciprocating said press on said base in the direction of movement of said plunger element.

17. A method of assembling chain structures, which includes: pressing opposite side members of a chain link upon a transverse hinge element carried by a support, by causing sidewise approach of said side members with respect to each other and transmitting side pressure from one of said side members upon the other through said transverse hinge element, and compensating lateral displacement of the virtual center between said mutually approaching side members with respect to said support.

IVAR F. LINDBERG.
WILLIAM E. YUNKER.